United States Patent [19]

Gibbs et al.

[11] 3,873,488

[45] Mar. 25, 1975

[54] LATEXES FOR CATHODIC ELECTROCOATING

[75] Inventors: Dale S. Gibbs; Earl H. Wagener; Ritchie A. Wessling, all of Midland, Mich.

[73] Assignee: The Dow Chemical Company, Midland, Mich.

[22] Filed: Jan. 2, 1974

[21] Appl. No.: 430,105

Related U.S. Application Data

[63] Continuation of Ser. No. 139,249, April 30, 1971, abandoned.

[52] U.S. Cl. .................. 260/29.7 H, 260/29.6 H, 260/29.6 TA, 260/29.7 T, 260/79.7, 260/607 B
[51] Int. Cl. ........................ C08d 7/00, C09d 5/02
[58] Field of Search ......... 260/79.7, 29.7 R, 29.7 H, 260/29.6 H, 29.6 TA, 607 B, 29.7 T

[56] References Cited
UNITED STATES PATENTS 3,078,259  2/1963  Hatch et al. .................... 260/607 B
3,462,462  8/1969  Hatch et al. .................... 260/607 B
3,544,532  12/1970  Jones et al. ...................... 260/79.7

OTHER PUBLICATIONS

Blackley – High Polymer Latices, (Vol. 1, Fundamental Principles), (MacLaren & Sons Ltd.), (London), (1966), pp. 53–58 & 274, TS 1890 B54.

Primary Examiner—Donald E. Czaja
Assistant Examiner—H. H. Fletcher
Attorney, Agent, or Firm—T. A. Murphy

[57] ABSTRACT

Aqueous dispersions particularly adapted for cationic electrodeposition are provided by copolymerizing a small portion of a water-soluble, polymerizable, ethylenically unsaturated sulfonium salt such as vinylbenzyl dimethyl sulfonium chloride with an ethylenically unsaturated essentially hydrophobic monomer, for example, n-butyl acrylate or a mixture of such monomers, for example, styrene and butadiene or n-butyl acrylate and methyl methacrylate. A small amount of a conventional cationic or non-ionic surfactant may be included.

9 Claims, No Drawings

LATEXES FOR CATHODIC ELECTROCOATING

CROSS-REFERENCE TO RELATED APPLICATION

This is a continuation of application Ser. No. 139,249 filed Apr. 30, 1971, now abandoned.

BACKGROUND OF THE INVENTION

1. Field of the Invention

The invention relates to cationically stabilized latexes which are suitable to form coatings especially by electrodeposition, and to a process for preparation of such latexes.

2. Description of the Prior Art

In the commonly used processes of electrodeposition, latex compositions are employed which are stabilized with anionic emulsifiers and such compositions are deposited at the anode. Certain electrodeposition systems which use cationic nitrogen-containing surfactants have been described such as in U.S. Pat. Nos. 3,454,482 and 3,455,806.

In the previously published descriptions of compositions which have been used for electrodeposition of coatings or have been recommended for such use, there has been no disclosure that the emulsifiers are electrically reducible under the usual conditions for electrodeposition or are thermally degradable under conditions which would not harm the coating.

In our copending application, Ser. No. 93,916, filed Nov. 30, 1970, now abandoned, of which Ser. No. 128,533 filed Mar. 26, 1971, is a continuation-in-part, a cationic electrodeposition process is described which employs aqueous polymer dispersions of organic, film-forming polymers which are maintained in aqueous dispersion primarily by a sulfonium surfactant.

SUMMARY OF THE INVENTION

In accordance with the present invention, aqueous dispersions of organic film-forming polymers, suitable for cationic electrodeposition as coatings, are prepared under usual emulsion polymerization conditions from polymerizable, ethylenically unsaturated monomers which when homopolymerized or copolymerized with each other form water-insoluble polymers and together therewith from about 0.5 part to about 10 parts preferably from about 2 parts to about 5 parts per 100 parts of the total monomer composition of a polymerizable sulfonium salt, optionally in the presence of small amounts such as less than about 5 parts on the same basis of conventional sulfonium surfactants.

The resulting aqueous dispersions provide coatings, especially by means of cationic electrodeposition, that release smaller amounts of volatile materials when the coatings are heated than dispersions which utilize only conventional surfactants of the same type to provide dispersion stability and to provide the means of transport in an electrodeposition system.

DESCRIPTION OF THE PREFERRED EMBODIMENTS

The aqueous dispersions of the invention require copolymers of a polymerizable, ethylenically unsaturated, water-soluble sulfonium salt. An illustrative formula for such salts is (I) 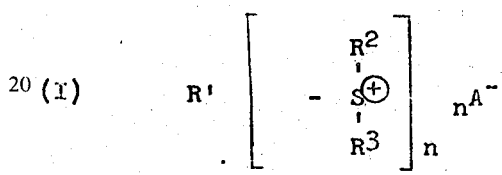

wherein R' is an n-valent organic radical, e.g., aliphatic, aromatic or alicyclic, having polymerizable ethylenic unsaturation, $R^2$ and $R^3$ individually are alkyl, monohydroxysubstituted alkyl, cycloalkyl, or aralkyl, $A^-$ is a water-soluble anion and n is an integer, i.e., ordinarily 1 or 2. R', $R^2$ and $R^3$ primarily constitute hydrocarbon chains but the chains can be interrupted with linkages such as oxygen, sulfur and nitrogen or by a keto, ester or amide linkage. The sum of the carbon atoms in R', $R^2$ and $R^3$ often is less than about 16 for each sulfonium group in the salt molecule.

The specific identity of the counterion $A^-$ is not critical. The counterion should not coagulate the dispersion nor react with the sulfonium ion in the dispersed state. Representative, but not limiting, examples are chloride, acetate, nitrate, propionate, hydrogen sulfate, bicarbonate and hydrogen phosphate.

Certain specific monomeric sulfonium salts are those of Formula I wherein R', $R^2$ and $R^3$, n and A are as shown in Table I. It should be recognized that these are illustrative representative operable materials and the listing by no means should be considered as all-inclusive.

TABLE I

| | R' | $R^2$ | $R^3$ | n | $A^-$ |
|---|---|---|---|---|---|
| 1. | $CH_2=CH-C_6H_4-CH_2-$ | $CH_3$ | $CH_3$ | 1 | $Cl^-$ |
| 2. | $CH_2=CH-C_6H_4-CH_2-$ | $C_2H_5$ | $C_2H_5$ | 1 | $NO_3^-$ |
| 3. | $CH_2=CH-C_6H_4-CH_2-$ | $CH_3$ | $CH_3$ | 1 | $Cl^-$ |
| 4. | $C_6H_4(CH=CH_2)-CH_2-$ | $CH_3$ | $CH_3$ | 1 | $NO_3^-$ |
| 5. | $CH_2=CH-C_6H_4-CH_2CH_2-$ | $CH_3$ | $CH_3$ | 1 | $CH_3COO^-$ |

TABLE I (Cont'd.)

| | R¹ | R² | R³ | n | A⁻ |
|---|---|---|---|---|---|
| 6. | $CH_2=C(CH_3)-C_6H_4-CH_2-$ | $CH_3$ | $CH_3$ | 1 | $H_2PO_4^-$ |
| 7. | $CH_2=CH-CH_2-$ | $CH_3$ | $C_4H_9$ | 1 | $HCO_3^-$ |
| 8. | $CH_2=C(CH_3)-CH_2-$ | $CH_3$ | $CH_3$ | 1 | $Br^-$ |
| 9. | $CH_2=CH-CH_2-$ | $CH_3$ | $CH_3$ | 1 | $Cl^-$ |
| 10. | $CH_2=CH-COOCH_2CH_2-$ | $CH_3$ | $CH_3$ | 1 | $Cl^-$ |
| 11. | $CH_2=CH-OOC-C_6H_4-CH_2-$ | $CH_3$ | $CH_3$ | 1 | $Br^-$ |
| 12. | $CH_2=CH-C(=CH_2)-CH_2-$ | $CH_3$ | $CH_3$ | 1 | $CH_3CH_2COO^-$ |
| 13. | $-CH_2CH=CH-CH_2-$ | $CH_3$ | $CH_3$ | 2 | $Cl^-$ |
| 14. | $CH_2=C(CH_3)-C_6H_4-CH_2-$ | $HOCH_2CH_2$ | $HOCH_2CH_2$ | 1 | $NO_3^-$ |
| 15. | $CH_2=CHOOC-CH_2CH_2CH_2-$ | $CH_3$ | $CH_3$ | 1 | $Cl^-$ |
| 16. | $-CH_2CH_2OOC-CH=CH-COO-CH_2CH_2-$ | $CH_3$ | $CH_3$ | 2 | $CH_3COO^-$ |
| 17. | naphthyl-$CH_2-$, $CH_2=CH-$ | $CH_3$ | $CH_3$ | 1 | $Cl^-$ |
| 18. | $CH_2=CH-CH(CH_3)-CH_2-$ | $CH_3$ | $C_6H_5-CH_2$ | 1 | $H_2PO_4^-$ |
| 19. | $CH_2=CH-C_6H_4-CH_2-$ | $CH_3$ | $CH_3$ | 1 | $CH_3COO^-$ |

The aqueous dispersions of this invention contain copolymers of (1) the monomeric sulfonium salts as described with (2) an essentially hydrophobic, polymerizable ethylenically unsaturated monomeric composition containing one or more polymerizable, ethylenically unsaturated compounds which when homopolymerized or copolymerized with each other form water-insoluble polymers, wherein the monomeric sulfonium salts ordinarily are used in an amount of from about 0.5 part to about 10 parts, preferably from about 2 parts to about 5 parts, for each 100 parts by weight of the total monomeric composition, but in any event are not used in sufficient quantity to make the polymer water-soluble.

Neutral, electrically non-conductive, polymerizable, ethylenically unsaturated compounds are represented by, but not restricted to, non-ionic monomers such as the alkenyl aromatic compounds, i.e., the styrene compounds, the derivatives of α-methylene monocarboxylic acids such as the acrylic esters, acrylic nitriles and methacrylic esters; derivatives of α,β-ethylenically unsaturated dicarboxylic acids such as maleic esters; unsaturated alcohol esters; conjugated dienes; unsaturated ketones; unsaturated ethers; and other polymerizable vinylidene compounds such as vinyl chloride and vinylidene fluoride. Specific examples of such ethylenically unsaturated compounds are styrene, α-methylstyrene, ar-methylstyrene, ar-ethylstyrene, α-ar-dimethylstyrene, ar,ar-dimethylstyrene, ar,ar-diethylstyrene, t-butylstyrene, vinylnaphthalene, hydroxystyrene, methoxystyrene, cyanostyrene, acetylstyrene, monochlorostyrene, dichlorostyrene, and other halostyrenes, methyl methacrylate, ethyl acrylate, butyl acrylate, hexyl acrylate, 2-ethylhexyl acrylate, lauryl methacrylate, phenyl acrylate, 2-hydroxybutyl acrylate, 2-hydroxybutyl methacrylate, 4-hydroxybutyl acrylate, and 4-hydroxybutyl methacrylate; acrylonitrile, methacrylonitrile, acryloanilide, ethyl α-chloroacrylate, ethyl maleate, vinyl acetate, vinyl propionate, vinyl chloride, vinyl bromide, vinylidene chloride, vinylidene fluoride, vinyl methyl ketone, methyl isopropenyl ketone, vinyl ethyl ether, 1,3-butadiene, and isoprene.

Such non-ionic monomers form water-insoluble homopolymers or water-insoluble copolymers when more than one of the group is used. However, there may be used as copolymerized constituents with the above kinds of monomers other non-ionic monomers which as homopolymers would be water-soluble. The hydrophilic, water-soluble, non-ionic monomers are represented by hydroxyethyl acrylate, hydroxyethyl methacrylate, acrylamide, methacrylamide, N-methylol acrylamide, N-methylol methacrylamide and other modified acrylamides such as diacetone acrylamide, and diacetone methacrylamide.

Such monomers, or the other more hydrophilic monomers described infra, are not used in sufficiently large proportions as to make the copolymer water-soluble or significantly electrically conductive. The proportion of such somewhat hydrophilic, water-soluble, non-ionic monomers which may be copolymerized constituents of the polymers operable in the practice of this invention ordinarily ranges from 0 to about 30 per cent or more based on the total weight of the copolymer.

Other more hydrophilic monomers may be used as constituents of the copolymers in smaller proportions, such as, less than about 4 per cent by weight. These hydrophilic monomers are represented by aminoalcohol esters of $\alpha,\beta$-ethylenically unsaturated carboxylic acids, especially of such acids having from 3 to 5 carbon atoms, illustrated by acrylic acid, methacrylic acid, maleic acid, fumaric acid, and itaconic acid; for example, 2-aminoethyl methacrylate hydrochloride, 2-aminoethyl acrylate hydrochloride, 2-aminopropyl acrylate hydrochloride, 2-aminopropyl methacrylate hydrochloride, 3-aminopropyl methacrylate hydrochloride and other amino alcohol esters as described in U.S. Pat. No. 3,108,979.

In the specification, by the term "essentially hydrophobic, polymerizable, ethylenically unsaturated monomer composition" is meant a monomer or mixture of monomers according to the foregoing description.

The aqueous dispersions of this invention are conveniently prepared from the above-described monomers by conventional emulsion polymerization using free-radical producing catalysts usually in an amount from about 0.01 per cent to about 3 per cent based on the weight of the monomers under conventional conditions of agitation, time, pressure, and temperature, using either a batchwise, incremental or continuous type addition of the monomers, water and other constituents to a reaction vessel or to a series of such vessels, or by polymerization in a coil reactor. Conventional additives for latex composition may be included in small but usual amounts and in a known manner. Such materials include, but are not restricted to, chain transfer agents, short stopping agents, buffers, anti-foaming agents, chelating agents, inorganic salts, plasticizers, tinting materials, bactericides, or other preservatives, and the like. Small amounts of non-ionic or cationic surfactants may also be employed, particularly when using the lower amount of the monomeric sulfonium salts. To minimize their effect on subsequent electro-deposition behaviour usually there will be used the smallest amount of added surfactants which gives the desired effect, such as particle size control or a particular degree of dispersion stability. Sometimes these surfactants are introduced into the polymerization mixtures as a component of a preformed seed latex. In a preferred process, to small amounts of a seed latex are added water, the polymerizable sulfonium salts, the other constituent monomers, the free-radical producing catalysts and any other ingredients of the emulsion polymerization recipe in an incremental or a continuous manner while maintaining agitation of the contents of the polymerization zone under conditions of pressure suitable for the monomeric composition being used and at a temperature suitable for the particular catalyst system and the decomposition temperature of the sulfonium salt being used, such temperatures usually being between about 0°C. and about 100°C., preferably below about 70°C. It is often advantageous to keep the rate of monomer addition low enough so that the monomer addition rate controls the rate of polymerization.

The catalysts are of the type which produce free-radicals and conveniently are per-oxygen compounds for example, the inorganic persulfate compounds such as sodium persulfate, potassium persulfate and ammonium persulfate; the inorganic peroxides such as hydrogen peroxide; the organic hydroperoxides such as cumene hydroperoxide and t-butyl hydroperoxide; the organic peroxides such as benzoyl peroxide, acetyl peroxide, lauroyl peroxide, peracetic acid and perbenzoic acid — sometimes activated by water-soluble reducing agents such as ferrous compound, sodium bisulfite or hydroxylamine hydrochloride — and other free-radical producing materials such as 2,2'-azobiisobutyronitrile.

The aqueous dispersions, i.e., the latex compositions, usually are prepared at a polymer solids content from about 35 per cent to about 60 per cent, preferably from about 40 per cent to about 50 per cent. When the dispersions are used for an electrodeposition process, they ordinarily are diluted with water to give a desired lower solids content before use such as from about 2 per cent to about 35 per cent, preferably from about 5 to about 12 per cent.

While the latex products of the invention may be used for a wide variety of purposes, especially coatings of various types, they are particularly desirable for use in electrodeposition processes which can be carried out over a wide range of pH to coat materials having an electro-conductive surface such as steel, copper, aluminum, phosphated steel, conductive polymers and the like. They are also advantageous for use in other deposition systems where a low ionic content is desirable such as in electro-conductive papers.

The compositions of the invention, when used for electrodeposition, are advantageous compared with the widely used anodic systems in that they are deposited at the cathode rather than the anode and thus in coating metals, since oxidation reactions do not occur at the cathode, no metal ions are produced in the electrodeposition process to cause coagulation and discoloration. The compositions also are advantageous compared with prior art compositions used in both anodic and cathodic electro-deposition processes in that while the anions or cations which provide the means of transport in the known anionic and cationic systems remain with the polymers and continue to be points of moisture sensitivity, the sulfonium cations of the polymerized sulfonium salts of the present invention will decompose into hydrophobic products during the electrodeposition and during subsequent heating of the coated material. The compositions are advantageous compared with aqueous dispersions stabilized with conventional sulfonium surfactants in that a lesser quantity of volatile by-products are obtained when the electrodeposited coatings are heated. Furthermore, in those instances where low molecular weight materials which are undesirable in the final product are introduced intentionally or inadvertently by the preparative steps and it is desired to remove them by dialysis, the products of the invention possess greater dispersion stability during and after dialysis than products prepared using only conventional surfactants.

In this specification, references to an electrodeposition test for suitability of a latex for cationic electrodeposition processes relate to a test which is carried out as follows unless specifically indicated otherwise:

In procedure A the latex being tested is diluted with water to a solids content of 10 per cent, and 70 grams of the diluted latex is introduced into a rectangular polyethylene electrodeposition cell 107 millimeters in length, 25.4 millimeters in width and 79 millimeters in depth containing two graphite anodes of equal size located at the ends of the long axis. A rectangular test panel of phosphated steel (Bonderite 37), except as otherwise indicated, 102 millimeters in length, 18 millimeters in width, and 1.6 millimeters in thickness, is placed in the latex to a depth of 20.2 millimeters halfway between the two anodes with the flat 102 mm. by 18 mm. plane normal to a line joining the two anodes and the length dimension oriented vertically. A source of direct current at a potential of 200 volts is connected to the two anodes and the steel sample which functions as the cathode. At the end of two minutes, the residual current is measured, the source of current is disconnected, then the coatings are examined, the coating weight determined and the efficiency, expressed as weight of coating per coulomb, is determined.

Procedure B is the same as procedure A except that the electrodeposition cell is 50 millimeters in width, 114 millimeters in length and 140 millimeters in depth; the steel test panel is 149 millimeters in length, 70 millimeters in width and 0.63 millimeter in thickness; the test panel is placed in the cell between the graphite anodes 1.9 millimeters from each, with the length dimension of the panel oriented vertically and sufficient latex is used to cover the test panel to a depth of from 70 to 72 millimeters.

The following examples show ways in which the present invention can be practiced, but should not be construed as limiting the invention. All parts and percentages are calculated by weight unless otherwise expressly indicated.

EXAMPLE I

Into a polymerization vessel were charged 5 parts of a 30 per cent solution of hydrogen peroxide, 0.0039 part of ferric chloride hexahydrate, 100 parts of water, sufficient hydrochloric acid to adjust the pH to 2.5, 0.7 part of vinylbenzyl dimethyl sulfonium chloride, 24 parts of styrene, 8 parts of vinylbenzyl chloride and 48 parts of n-butyl acrylate. The contents of the polymerization vessel were stirred for 25 hours at 70°C.

There was obtained thereby a stable latex at an acid pH having a solids content of 42.5 per cent, and containing vinylbenzyl dimethyl sulfonium chloride in copolymerized form.

The latex was tested in the electrodeposition process (procedure A) described supra. For five replicate samples, coatings which were smooth and uniform were deposited having an average thickness of 0.4 mil with an efficiency of 10.4 milligrams of coating per coulomb and the residual current was 3.0 milliamperes.

EXAMPLE II

A monomer solution was prepared from 960 parts of n-butyl acrylate and 640 parts of styrene with 5.0 parts of a catalyst, tertiary-butyl hydroperoxide (82.7 per cent active).

In a seed step 25 parts of the monomer solution, 750 parts of distilled water, 10 parts of dodecylbenzyl-dimethyl sulfonium chloride and sufficient acetic acid to give a pH of 3.5 were introduced into a polymerization vessel and the temperature of the resulting mixture was held at 30°C., the system was purged with nitrogen, then there was added in a continuous manner at a rate of 7.67 parts per hour an aqueous solution of hydroxylamine hydrochloride at a concentration of 1.8 parts per 100 parts of water while the contents of the reactor were stirred. The mixture was observed for the appearance of blue turbidity which indicated a small particle-sized latex was being formed and the "seed reaction" was then continued for an additional 90 minutes. A monomer stream from the previously prepared monomer mixture was added at the rate of 55 parts per hour for 20 hours. Concurrently therewith, an emulsifier solution at a pH of 3.5 prepared from 25 parts of dodecylbenzyl dimethyl sulfonium chloride, 27.5 parts of vinylbenzyl dimethyl sulfonium chloride and 500 parts of water was added at a rate of 20 parts per hour. The addition of hydroxylamine hydrochloride solution was continued for about one hour after the addition of the monomer solution and of the emulsifier solution were discontinued. A stable latex product was obtained thereby having an average particle size of 1010 Angstroms, a solids content of 46.3 per cent, and a pH of 3.1.

A portion of the latex product in the electrodeposition test (procedure A) provided a coating of 0.050 milligram per square millimeter with a residual current of 3.5 milliamperes and an efficiency of 9.2 milligrams per coulomb.

EXAMPLE III

Another latex was prepared in the same manner using the same materials in the same proportion as in Example II except that allyl dimethyl sulfonium chloride was substituted for the vinylbenzyl dimethyl sulfonium chloride. The stable latex product had an average particle size of 2200 Angstroms, a solids content of 44.4 per cent, a pH of 2.5 and contained allyl dimethyl sulfonium chloride in copolymerized form.

In the electrodeposition test (procedure A), the residual current was 0.4 milliampere and a smooth, uniform, thin coating was applied to the steel sample at a coating weight of 0.013 milligram per square millimeter with an efficiency of 12.1 milligrams per coulomb.

EXAMPLE IV

Another latex was prepared as described in Example II using the same materials in the same proportions and in the same procedural steps except that for the vinylbenzyl dimethyl sulfonium chloride there was substituted an equal amount by weight of dimethyl (2-methylene-3-butenyl) sulfonium chloride. The stable latex product had an average particle size of 975 Angstroms, a solids content of 48.1 per cent, a pH of 4.3 and contained the dimethyl (2-methylene-3-butenyl) sulfonium chloride in copolymerized form.

In the electrodeposition test (procedure A) the residual current was 1.4 milliamperes and a smooth, uniform, thin coating was applied to the steel sample at a coating weight of 0.014 milligram per square millimeter and an efficiency of 12.5 milligrams per coulomb.

EXAMPLE V

Into a pressure polymerization vessel were placed 8.75 grams of phosphoric acid, 20 grams of dodecylbenzyl dimethyl sulfonium chloride, sufficient water to provide 2000 milliliters of solution and sufficient ammonium hydroxide to give a pH of 5. After flushing the vessel three times with vacuum and nitrogen, 50 grams of styrene and 50 grams of butadiene were introduced, then the contents of the polymerization vessel were stirred and maintained at a temperature of 50°C. A continuous stream of catalyst solution, which had been prepared from 32.5 grams of tertiary-butyl hydroperoxide (87.4 per cent active) in 500 milliliters of water, was started in a continuous manner at a rate of 10 milliliters per hour. Concurrently therewith a solution which had been prepared from 14 grams of hydroxylamine hydrochloride in 500 milliliters of water was added continuously at a rate of 10 milliliters per hour. The resulting seed reaction was continued for three hours, then the main monomer mixture which had been prepared previously from 1200 grams of styrene 1500 grams of butadiene and 300 grams of acrylonitrile was introduced as a continuous stream at the rate of 110 grams per hour for 19.5 hours and concurrently therewith an emulsifier stream at the rate of 40 milliliters per hour which had been prepared previously from 100 grams of dodecylbenzyl dimethyl sulfonium chloride, 90 grams of an aqueous solution containing 63.3 per cent of vinylbenzyl dimethyl sulfonium chloride, sufficient water to provide 1000 milliliters of solution and sufficient ammonium hydroxide to give a pH of 5. The addition of the solutions of tertiary-butyl hydroperoxide and of hydroxylamine hydrochloride were continued for about one hour after completion of the monomer and emulsifier streams. There was obtained thereby a stable latex containing vinylbenzyl dimethyl sulfonium chloride in copolymerized form. The latex had a solids content of 43.2 per cent, a particle size of 1230 Angstroms, a pH of 2.5 and a surface tension of 45 dynes per centimeter.

A portion of the latex was tested in the electrodeposition process (procedure B) on phosphated steel and uncoated steel. The results, as an average of two samples, were as follows:

| | Phosphated Steel | Uncoated Steel |
|---|---|---|
| Coating weight, milligrams/millimeter$^2$ | 0.053 | .025 |
| Residual current, milliamperes | 60. | 100. |
| Efficiency, milligrams of coating/coulomb | 9.6 | 7.7 |

EXAMPLE VI

Another latex was prepared as described for Example V except that the monomer mixture for the main monomer stream was prepared from 1500 grams of styrene and 1500 grams of butadiene and the addition times of that stream and of the emulsifier stream, were 20 hours. The stable latex product obtained thereby had a solids content 43.3 per cent, a pH of 2.5, a particle size of 1280 Angstroms, a surface tension of 50.5 dynes per centimeter and contained vinylbenzyl dimethyl sulfonium chloride in copolymerized form.

A portion of the latex was tested in the electrodeposition process (procedure B). A coating was deposited on the steel sample at a coating weight of 0.029 milligram per square millimeter, with a residual current of 30.0 milliamperes and with an efficiency of 6.2 milligrams of coating per coulomb, calculated as an average of duplicate determinations.

EXAMPLE VII

A latex was prepared substantially as described in Example II except that 1600 parts of n-butyl acrylate was used instead of a mixture of styrene and n-butyl acrylate, the amount of catalyst was 9.5 parts instead of 5.0 parts; in the monomer portion of the seed step 50 parts of the monomer were used instead of 25, and in the aqueous portion of the seed step, the amount of water was adjusted to give a total of 1000 parts of aqueous solution, and the emulsifier stream was added at the rate of 20 parts per hour of an aqueous solution of 62.5 parts of dodecylbenzyl dimethyl sulfonium chloride and 43 parts of an aqueous solution containing 63.8 per cent of vinylbenzyl dimethyl sulfonium chloride which was diluted with water to a total of 500 parts. There was obtained thereby a very stable latex containing a copolymer of n-butyl acrylate and vinylbenzyl dimethyl sulfonium chloride and having a solids content of 43.3 per cent, a pH of 2.5, a surface tension of 30.8 dynes per centimeter, and a particle size of 1300 Angstroms.

A portion of the latex product in the electrodeposition test (procedure B) gave a very smooth, uniform coating on the steel sample with a coating weight of 0.049 milligram per square millimeter, a residual current of 75.0 milliamperes and an efficiency of 12 milligrams of coating per coulomb calculated as an average of duplicate determinations.

EXAMPLE VIII

A latex was prepared substantially as described in Example VII except that 1120 parts of n-butyl acrylate and 480 parts of methyl methacrylate were used instead of 1600 parts of n-butyl acrylate, and the temperature for the process was 50°C. rather than 30°C. The product was a stable latex having a particle size of 1280 Angstroms, a solids content of 42.8 per cent, a pH of 2.5, and a surface tension of 30.8 dynes per centimeter.

A portion of the latex in the electrodeposition test (procedure B) provided a thin coating on the steel test panel at a coating weight of 0.048 milligram per square millimeter, with a residual current of 75 milliamperes, and with an efficiency of 11.4 milligrams of coating per coulomb.

EXAMPLE IX

A monomer mixture was prepared from 800 grams of tertiary-butylstyrene, 800 grams of isoprene and 34.5 grams of a catalyst composition, cumene hydroperoxide (70 per cent active). A 50-gram portion of the monomer mixture was added to a nitrogen-purged reaction vessel containing an aqueous solution having a pH of 3.5 which had been prepared from 1500 grams of water, 111.5 grams of an aqueous solution containing 17.4 per cent of dodecylbenzyl dimethyl sulfonium chloride, and 0.2 milliliter of an aqueous solution of ferric nitrate containing 1000 parts per million of ferric ion. While the contents of the reaction vessel were stirred and the temperature thereof maintained at 30°C., an aqueous solution containing 1 gram of sodium formaldehyde sulfoxylate for each 100 milliliters of water was added at the rate of 50 milliliters per hour for 24 hours. Three hours after the start of that addition, an aqueous solution which had been prepared from 50 grams of vinylvenzyl dimethyl sulfonium chloride and sufficient water to provide 800 milliliters of solution was pumped into the reaction vessel at the rate of 20 milliliters per hour for 20 hours. Two additional portions, 1 milliliter each, of cumene hydroperoxide were added during the polymerization. There was obtained thereby a stable latex having a solids content of 28.0 per cent, and an average particle size of about 1200 Angstroms.

A portion of the latex product was diluted with an equal quantity of water and tested in a simplified electrodeposition procedure using a steel cathode, a potential of 10 volts. The current reached a maximum of 500 milliamperes with a rapid drop to 20 milliamperes. A uniform, thin coating of polymer was deposited on the steel cathode.

Another portion of the latex product was dialyzed against deionized water until the emulsifier, i.e., the dodecylbenzyl dimethyl sulfonium chloride added in the seed step of the latex preparation, was removed. The resulting stable latex, at a solids concentration of 1.51 per cent was subjected to the simplified electrodeposition process described above except that the cathode was a copper wire and the potential was 200 volts. The current reached a maximum of 300 milliamperes then dropped to an undetectable amount in 0.1 second. A thin, slightly opaque, bubble-free film of polymer was thereby coated on the copper wire.

That which is claimed is:

1. An aqueous dispersion comprising an aqueous medium having stably dispersed therein a water-insoluble film-forming copolymer of (1) an essentially hydrophobic, polymerizable, ethylenically unsaturated monomer or mixture of monomers consisting essentially of one or more neutral, electrically non-conductive, polymerizable, ethylenically unsaturated compounds which when in the form of homopolymers or copolymers with each other are water insoluble and (2) a polymerizable, water-soluble, ethylenically unsaturated sulfonium salt in an amount insufficient to make the copolymer water-soluble consisting of from about 0.5 part to about 10 parts for each 100 parts by weight of total monomers; wherein the dispersion stability is provided at least in part by the copolymerized sulfonium salt.

2. The aqueous dispersion of claim 1 in which the water-soluble sulfonium salt has the formula

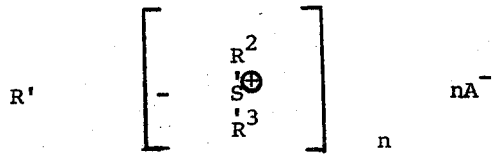

wherein R' is an alphatic, aromatic or alicyclic organic n-valent radical having polymerizable ethylenic unsaturation and which primarily constitutes a hydrocarbon chain which can be interrupted by oxygen, nitrogen or sulfur or by a keto, ester or amide linkage; $R^2$ and $R^3$ individually are alkyl, monohydroxy-substituted alkyl, cycloalkyl, or aralkyl, or modified such groups which primarily constitute a hydrocarbon chain which is interrupted by oxygen, nitrogen or sulfur or by a keto, ester or amide linkage, $A^-$ is a water-soluble anion which does not react with the sulfonium ion in the dispersed state and does not coagulate the dispersion and $n$ is 1 or 2.

3. The aqueous dispersion of claim 1 in which the sulfonium salt is present in an amount of from about 2 per cent to about 5 per cent based on the total weight of the copolymerized monomers.

4. The aqueous dispersion of claim 1 in which the sulfonium salt is a vinylbenzyl dialkyl sulfonium salt.

5. The aqueous dispersion of claim 4 in which the sulfonium salt is a vinylbenzyl dimethyl sulfonium salt.

6. The aqueous dispersion of claim 1 in which the sulfonium salt is an allyl dimethyl sulfonium salt.

7. The aqueous dispersion of claim 1 in which the sulfonium salt is a 2-methylene-3-butenyl dimethyl sulfonium salt.

8. The aqueous dispersion of claim 2 in which the water-soluble anion is chloride.

9. The aqueous dispersion of claim 1 in which the copolymer is an emulsion copolymer.

* * * * *